(12) United States Patent
Shi et al.

(10) Patent No.: US 12,143,963 B2
(45) Date of Patent: Nov. 12, 2024

(54) METHODS AND APPARATUSES FOR UE GROUPING

(71) Applicant: LENOVO (BEIJING) LIMITED, Beijing (CN)

(72) Inventors: Jie Shi, Beijing (CN); Lianhai Wu, Beijing (CN); Haiming Wang, Beijing (CN); Jie Hu, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 227 days.

(21) Appl. No.: 17/602,755

(22) PCT Filed: Apr. 10, 2019

(86) PCT No.: PCT/CN2019/082052
§ 371 (c)(1),
(2) Date: Oct. 9, 2021

(87) PCT Pub. No.: WO2020/206632
PCT Pub. Date: Oct. 15, 2020

(65) Prior Publication Data
US 2022/0174644 A1  Jun. 2, 2022

(51) Int. Cl.
*H04W 68/02* (2009.01)

(52) U.S. Cl.
CPC .................. *H04W 68/02* (2013.01)

(58) Field of Classification Search
CPC ........................ H04W 52/0219; Y02D 30/70
USPC ........................................................ 455/458
See application file for complete search history.

(56) References Cited

U.S. PATENT DOCUMENTS

| | | | |
|---|---|---|---|
| 2006/0068813 A1* | 3/2006 | Ku | H04W 68/04 455/458 |
| 2007/0118549 A1* | 5/2007 | Bornhoevd | G06F 9/5027 |
| 2010/0087210 A1* | 4/2010 | Lee | H04W 68/00 455/458 |
| 2017/0171724 A1* | 6/2017 | Kazmi | H04W 76/10 |
| 2018/0270790 A1* | 9/2018 | Shi | H04W 68/02 |
| 2018/0279274 A1* | 9/2018 | Sun | H04W 52/367 |
| 2021/0153120 A1* | 5/2021 | Atungsiri | H04L 27/2655 |

FOREIGN PATENT DOCUMENTS

CN          109309555 A          2/2019

OTHER PUBLICATIONS

Nokia, Nokia Shanghai Bell, Report on email discussion [104#42] [NB-Iot R16] Services based Group Wake Up signal analysis, 3GPP TSG-RAN WG2 Meeting #105, R2-1900317, Feb. 25-Mar. 1, 2019, pp. 1-9, Athens, Greece.
Ericsson, Mobility WUS group and paging multiplexing, 3GPP TSG-RAN WG2 #105bis, R2-1904498, Apr. 8-12, 2019, pp. 1-7, Xi'An, China.

(Continued)

*Primary Examiner* — Fabricio R Murillo Garcia
(74) *Attorney, Agent, or Firm* — Kunzler Bean & Adamson

(57) ABSTRACT

Methods and apparatuses for UE grouping are disclosed. A method at a remote unit comprises receiving parameters on service information and grouping rule information; and computing a group ID based on the parameters on service information and the grouping rule information.

17 Claims, 7 Drawing Sheets

(56) References Cited

OTHER PUBLICATIONS

Nokia, Nokia Shanghai Bell, Analysis of Services based GWUS, 3GPP TSG-RAN WG2 Meeting #105bis, R2-1903380, Apr. 8-Apr. 12, 2019, pp. 1-5, Xian, China.
International Searching Authority, "Written Opinion of the International Searching Authority," PCT/CN2019/082052, Dec. 31, 2019, pp. 1-5.
Huawei, Hisilicon, Feasibility of MO/MT service type based WUS grouping, 3GPP TSG-RAN WG2 Meeting #105bis, R2-1903418, Apr. 8-12, 2019, pp. 1-4, Xi'an, China.
Nokia, Nokia Shanghai Bell, Analysis of Group WUS Options, 3GPP TSG-RAN WG2 Meeting #104, R2-1817048, Nov. 12-16, 2018, pp. 1-5, Spokane, USA.

\* cited by examiner

METHODS AND APPARATUSES FOR UE GROUPING

FIELD

The subject matter disclosed herein generally relates to wireless communications and, more particularly, to methods and apparatuses for UE grouping.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Physical Uplink Shared Channel (PUSCH), Physical Uplink Control Channel (PUCCH), Physical Downlink Shared Channel (PDSCH), Time division multiplexing (TDM), Code division multiplexing (CDM), Orthogonal Cover Code (OCC), Narrow Band Internet of Things (NB-IoT), wake up signal (WUS), group WUS (GWUS), paging occasion (PO), Identity (ID), Mobile Originating (MO), Mobile Terminated (MT), Circuit Switch (CS), Packet Switch (PS), Discontinuous Reception (DRX), Extended Discontinuous Reception (eDXR), Mobility Management Entity (MME), enhanced machine type of communication (eMTC), System Information Block (SIB), Radio Resource Control (RRC), Core Network (CN).

In NB-IoT technology, a wake up signal (WUS) mechanism is introduced for power saving, wherein the WUS indicates whether there is a paging process in a pre-defined paging occasion (PO).

Specifically, when the WUS mechanism is disabled, a UE always monitors paging messages on POs. When the WUS mechanism is enabled, the UE only monitors the following possible paging messages in POs in response to the UE receiving a WUS. PDCCH blind detection is used for monitoring the PO.

In R15, multiple UEs paged in the same PO may be associated to a same WUS. For example, ten (10) UEs monitor the same WUS. In this condition, if any one of the ten UEs is paged, the WUS will be sent. All of the ten UEs will receive the WUS. Therefore, all of the ten UEs including the paged UE and the other nine UEs that are not paged have to monitor the paging since the WUS is received. Since no actual paging information for the other nine UEs will be received, it is power wasting for these nine UEs to perform the PDCCH blind detection for paging To reduce this false alarm probability, in NB-IOT/eMTC R16 WI (Work Item), group wake-up signal (GWUS) is supported. So far, only UE_ID based grouping method is agreed. For example, if the number of groups (N) is 4, ten UEs could be grouped into 4 groups by UE_IDs mod N. That is, UEs with IDs 1, 5 and 9 are in group1, UEs with IDs 2, 6 and 10 are in group2, UEs with IDs 3 and 7 are in group3, and UEs with IDs 4 and 8 are in group4. The group4 may be named as group0. The UE(s) in the same group will monitor the same GWUS.

Accordingly, if UE1, UE5 and UE9 are in the same group, the paging to UE1 will only trigger UE5 and UE9 to monitor the following paging, the other UEs that are not in the same group (for example, UEs 2-4, 6-8 and 10) do not need to monitor the paging. Therefore, only the UEs in the same group will monitor the same WUS and trigger the paging monitoring by this common WUS.

The UE_ID based grouping method does not consider the services performed by the UEs. For example, some UEs are busy at night while some UEs are busy in the morning. In other words, a service may be time-specific. It is obvious that if the UEs that are necessary to be paged at the same time are grouped together, then paging alarm probability can be reduced and the power saving can be achieved. In addition, some UEs may be stationary within a certain cell while some UEs may be mobile from a cell to another cell. If a UE is mobile and cannot be reached by the network in the last-known cell, the paging will be escalated and the paging area will be extended in order to reach the UE. Therefore, instead of only increasing the probability of false paging for UEs in the same cell, a mobile UE can increase the probability of false paging for all UEs in a larger set of cells, sometimes even the entire Tracking Area. Therefore, the UEs that are stationary or mobile should be grouped differently.

In this disclosure, we propose new methods to implement the UE grouping.

BRIEF SUMMARY

Methods and apparatuses for UE grouping are disclosed.

In one embodiment, a method at a remote unit comprises receiving parameters on service information and grouping rule information; and computing a group ID based on the parameters on service information and the grouping rule information.

In some embodiment, the grouping rule information may be associated with time.

In some embodiment, the service information is at least one of paging probability information and mobility information. The paging probability information may indicate whether the paging probability is predictable or unpredictable or whether the paging probability is regular or random. The paging probability information could be paging probability information associated to time information. The paging probability information associated to time information may be paging pattern based on time, or paging probability with timer, or paging probability with time range, or paging probability with enable or disable indication, or a combination thereof. The mobility information may implicitly or explicitly indicate whether the remote unit is stationary or mobile. In particular, the mobility information may implicitly or explicitly indicate whether the remote unite is stationary or mobile relative to a base unit or a specific cell of the base unit. The mobility information may be mobility information associated with time information. The mobility information associated with time information may be mobility pattern based on time, or mobility information with timer, or mobility information with time range, or mobility information with enable or disable indication, or a combination thereof.

In some embodiment, the method further comprises sending parameters on service information of the remote unit to a CN node or to a base unit.

In some embodiment, the grouping rule information maps remote units into UE groups supported by group WUS resources based on UE grouping method, wherein a part of the UE groups are grouped according to UE_ID based method, and the other UE groups are grouped according to paging probability based method. In the condition that mobility attribution is applied, the UE groups including the groups according to UE_ID based method and the groups according to paging probability based method are allocated to UEs with the same mobility attribution. In addition, the groups according to UE_ID based method and the groups according to paging probability based method may belong to different WUS channels. The UE groups with different mobility attribution may belong to different WUS channels.

In some embodiment, in the condition that UE grouping method indicated by the grouping rule information received from a CN node or implied by the parameters on service information is different from UE grouping method indicated by the grouping rule information received from a base unit, the group ID is computed according to the parameters on service information and the UE grouping method indicated by the grouping rule information received from the base unit.

In another embodiment, a method at a base unit comprises determining grouping rule information; and transmitting the grouping rule information to configure a remote unit to compute a group ID based on the parameters on service information and the grouping rule information.

In yet another embodiment, a method at a CN node comprises determining parameters on service information; and transmitting at least one of the parameters on service information to trigger a remote unit to compute a group ID based on the parameters on service information and grouping rule information, and parameters on service information or at least a part thereof to a base unit.

In further embodiment, a remote unit comprises a receiver configured to receive parameters on service information and grouping rule information and a processor configured to compute a group ID based on the parameters on service information and the grouping rule information.

In yet further embodiment, a base unit comprises a processor configured to determines grouping rule information; and a transmitter configured to transmit the grouping rule information to configure a remote unit to compute a group ID based on the parameters on service information and the grouping rule information.

In still further embodiment, a CN node comprises a processor configured to determine parameters on service information; and a transmitter configured to transmit at least one of the parameters on service information to trigger a remote unit to compute a group ID based on the parameters on service information and grouping rule information, and parameters on service information or at least a part thereof to a base unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered as limiting of scope, the embodiments will be described and explained with additional specificity and detail using accompanying drawings, in which.

DETAILED DESCRIPTION

Figure 1:
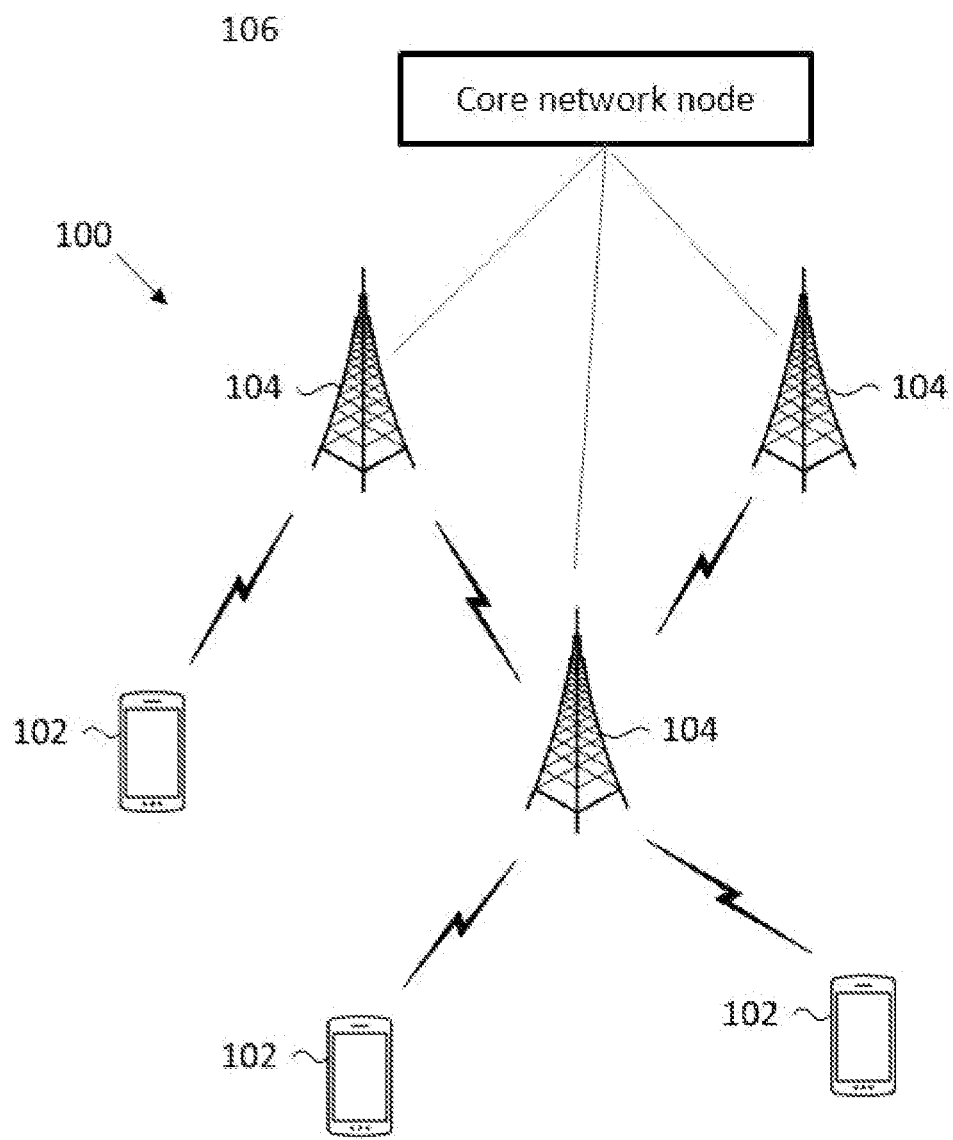
FIG. 1 is a schematic block diagram illustrating one embodiment of a wireless communication system.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for UE grouping. In one embodiment, the wireless communication system 100 includes remote units 102, base units 104 and a CN node 106. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art. The remote units 102 may be Narrow Band Internet of Things (NB-IoT) terminals.

The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with 3GPP 5G new radio (NR). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

Figure 2:
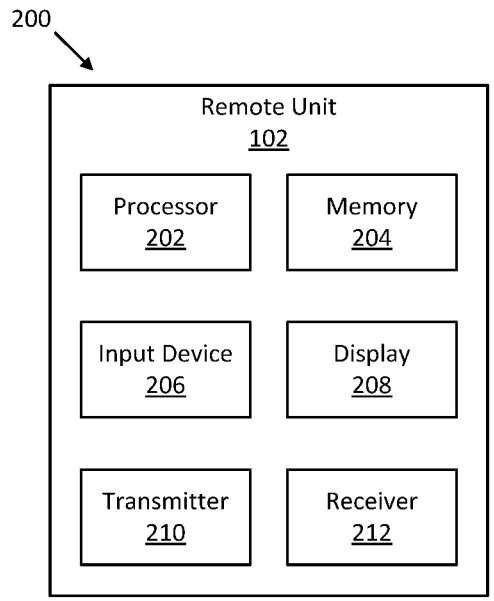
FIG. 2 is a schematic block diagram illustrating one embodiment of an apparatus that may be used for UE grouping.

The core network node (CN node) 106 is a control plane network element that handles signaling related to access, mobility or security for the remote units 102. For example, the CN node 106 may be a Mobility Management Entity (MME), or AMF in NR system, or some function or node in core network. The core network node owns the capability to handle signaling related to access, mobility or security for the remote units 102. FIG. 2 depicts one embodiment of an apparatus 200 that may be used for UE grouping. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
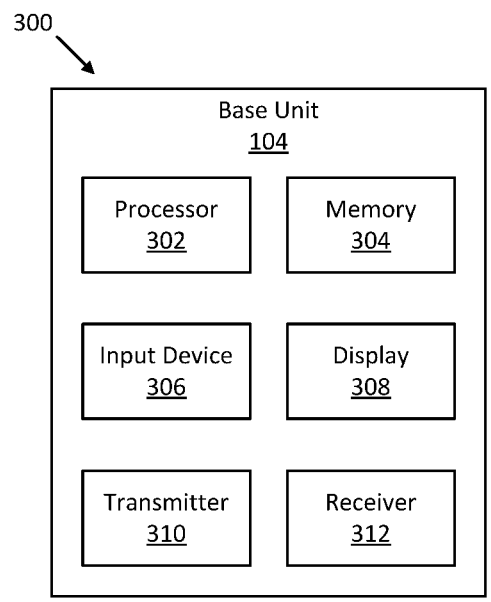
FIG. 3 is a schematic block diagram illustrating one embodiment of another apparatus that may be used for UE grouping.

FIG. 3 depicts one embodiment of another apparatus 300 that may be used for UE grouping. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
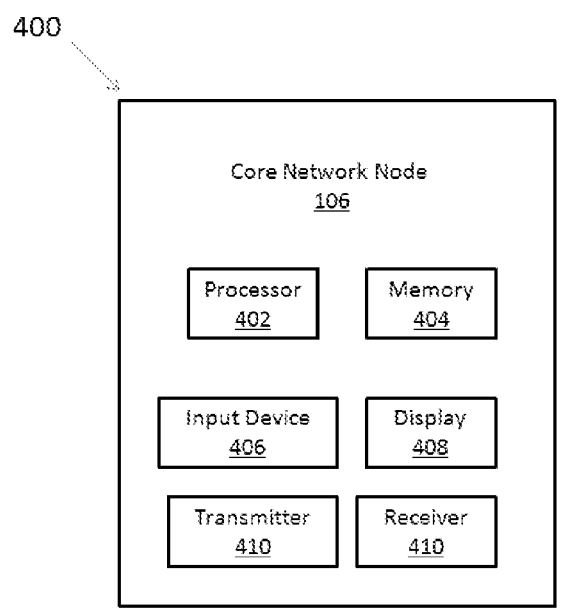
FIG. 4 is a schematic block diagram illustrating one embodiment of yet another apparatus that may be used for UE grouping.

FIG. 4 depicts one embodiment of another apparatus 400 that may be used for UE grouping. The apparatus 400 includes one embodiment of the CN node 106. Furthermore, the CN node 106 may include at least one of a processor 402, a memory 404, an input device 406, a display 408, a transmitter 410 and a receiver 412. As may be appreciated, the processor 402, the memory 404, the input device 406, the display 408, the transmitter 410 and the receiver 412 may be substantially similar to the processor 202, the memory 204, the input device 206, the display 208, the transmitter 210, and the receiver 212 of the remote unit 102, respectively.

The service in this document could be similar to the concept of traffic, data transmission or session in communication network.

Figure 5:
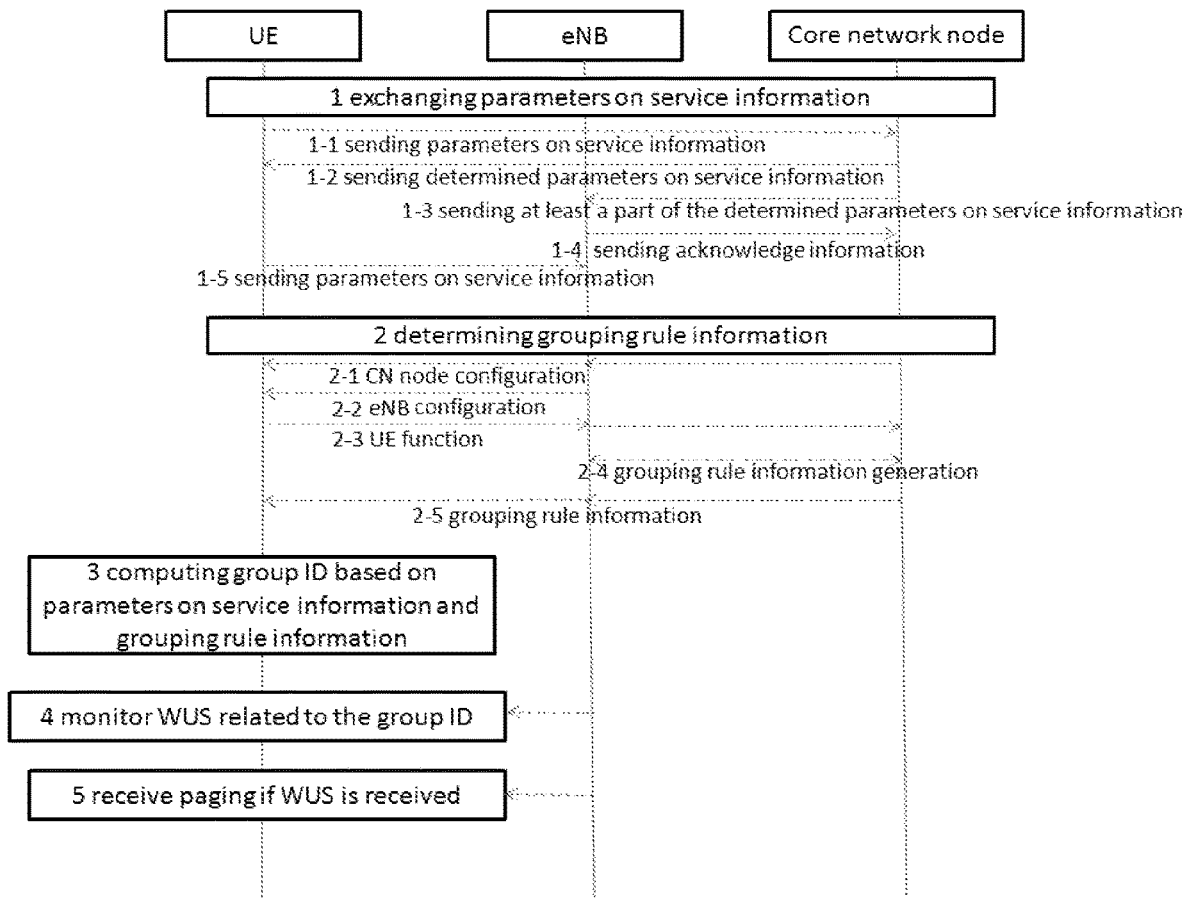
FIG. 5 is a flow chart diagram illustrating a method for UE grouping.

FIG. 5 shows a method for UE grouping according to an embodiment.

In step 1, parameters on service information are exchanged among UE, CN node and eNB. The parameters on service information include at least one of paging probability information and UE mobility information. The paging probability may be a value between 0 and 1. Alternatively, the paging probability may be a level, such as high level, middle level or low level (or such as simply high level or low level). The paging probability may be related to the times of service generating (paging) in a first period T1 and the number of paging occasions in a second period T2. The second period T2 may be the same as the first period T1. In particular, the paging probability is proportional to the times of service generating (paging) and inversely proportional to the number of paging occasions. More specifically, the paging probability is the ratio of the times of service generating (paging) in a first period T1 to the number of paging occasions in the second period T2.

The paging probability information indicates whether the paging probability of UE is predictable or unpredictable, or in other words, whether the paging probability is regular or random. A predictable paging probability may be alternatively referred to as a regular paging probability, where its service is triggered regularly in time domain. While an unpredictable paging probability may be alternatively referred to as a random paging probability, where its service is triggered randomly in time domain. For example, suppose the UE is a NB-IoT terminal such as a street lamp. The street lamp may be turned on at a specific time (e.g. 7 PM) and be turned off at another specific time (e.g. 6 AM). Therefore, the paging probability of the street lamp is predictable (regular). For another example, suppose the UE is NB-IoT terminal such as a sensor. The sensor may transmit a signal whenever it senses a temperature being more than a threshold temperature. Therefore, the paging probability of the sensor is unpredictable (random).

In the condition that the paging probability is predictable (regular), the predictable (regular) paging probability may be represented as paging probability information associated with time information (or paging probability information associated with time attributions), which may be in at least one of the following form or combination thereof:

paging pattern based on time;
paging probability with timer;
paging probability with time range; and
paging probability with enable or disable indication.

An example of paging pattern based on time is shown in Table 1:

| Field | Possible values |
| --- | --- |
| Indicator of time length unit | minute, hour, day, month, year, etc |
| Period 1 (e.g. 5-7) | 1 |
| Period 2 (e.g. 7-18) | 0 |
| Period 3 (e.g. 18-20) | 1 |
| ... | |
| Period N | a value between 0 and 1 |

In the above Table 1, the "indicator of time length unit" indicates the unit value used for periods 1 to N. In the example of Table 1, the unit value is "hour" (underlined in Table 1). Therefore, period 1 refers to hours 5-7 (i.e. 5 AM to 7 AM). In the period 1, the paging probability is 1. Similarly, period 2 refers to hours 7-18 (i.e. 7 AM to 6 PM). In the period 2, the paging probability is 0. Period 3 refers to hours 18-20 (i.e. 6 PM to 8 PM). In the period 3, the paging probability is 1. As shown for period N, the possible value for a paging probability ranges between 0 and 1. The paging probability value may be alternatively represented as "high level" or "middle level" or "low level" (or simply "high level" or "low level").

As for the paging probability with timer, the paging probability could be set to a value (e.g. 1 or high level) with a timer of 1 hour, which means that the value of the paging probability (e.g. 1 or high level) is only effective within 1 hour. In addition, the paging probability could be set to another value (e.g. 0 or low level) with another timer of 11 hours, which means that the value of the paging probability (e.g. 0 or low level) is only effective within 11 hours.

As for the paging probability with time range, the paging probability will be effective in a time range. For example, the paging probability may be effective from 5 to 7 AM.

In addition, the paging pattern, the timer for the paging probability and the time range for the paging probability may be indicated as being recycled (which means that it is effective until another paging probability information associated with time information is effective) or being not recycled (which means that it is effective only once).

As for the paging probability with enable or disable indication, the paging probability may be enabled or disabled by this indication.

The UE mobility information generally indicates whether the UE is stationary or mobile. It could be expressed by the speed of UE crossing the cells (for example, high or middle or low speed). Alternatively, a UE being stationary may mean that the UE stays in the last serving cell in UE_CONNECTED mode, while a UE being mobile may mean that the UE does not stay in the last serving cell in UE_CONNECTED mode but has moved to another serving cell. The last serving cell corresponds to the last reporting of UE's whereabouts, e.g. given by the IE 'Cell Identifier and Coverage Enhancement Level' in TS 36.413. This is the cell where UE established its last connection prior to monitoring for paging. In particular, a UE being stationary may mean that the UE stays in the cells or eNB identified by Cell Identifier and Coverage Enhancement Level and/or by Information on Recommended Cells and eNBs for Paging, while a UE being mobile may mean that the UE does not stay in cells or eNB identified by Cell Identifier and Coverage Enhancement Level and/or by Information on Recommended Cells and eNBs for Paging. Thus, the mobility information of UE means being stationary or mobile relative to some specific cell or eNB. Here, Information on Recommended Cells and eNBs for Paging could be Information on Recommended Cells and eNBs for UE in mobile for GWUS UE grouping, or Information on Recommended Cells and eNBs for Paging could be Information on Recommended Cells and eNBs for UE in stationary for GWUS UE grouping.

For example, suppose the UE is a NB-IoT terminal such as a sharing bicycle. The sharing bicycle is basically busy during rush hours, for example, from 7 to 9 AM and from 5 to 7 PM. During these periods, the mobility information of the sharing bicycle is set to high. On the other hand, from 9 AM to 5 PM, the mobility information of the sharing bicycle is set to middle, while in other time periods, e.g. from 11 PM to 5 AM, the mobility information of the sharing bicycle is set to low. For example, the UE (sharing bicycle) may run around some eNB or cells, so the UE is stationary for these cells or eNB, but the UE is mobile for other cells or eNB. The UE needs to monitor the WUS associated to UE group(s) based on UE mobility information.

In the condition that the UE mobility information is mobile, the mobile UE mobility information may be represented as mobility information associated with time information (or mobility information associated with time attributions), which may be in at least one of the following form or combination thereof:

mobility pattern based on time;
mobility information with timer;
mobility information with time range; and
mobility information with enable or disable indication.

An example of mobility pattern based on time is shown in Table 2:

| Field | Possible values |
|---|---|
| Indicator of time length unit | minute, hour, day, month, year, etc |
| Period 1 (e.g. 7-9) | high |
| Period 2 (e.g. 9-17) | middle |
| Period 3 (e.g. 17-19) | high |
| ... | |
| Period 4 (e.g. 23-24 and 0-5) | low |
| ... | |
| Period N | high or middle or low |

In the above Table 2, the "indicator of time length unit" indicates the unit value used for periods 1 to N, which might be minute, hour, day, month, year, etc. For period 1 to period N, the value may be high or middle or low.

As for the mobility information with timer, the mobility information will be effective in a timer. For example, the sharing bicycle is basically busy during rush hours, for example, from 7 to 9 AM and from 5 to 7 PM. In view of the above, the mobility information may be set to high at 7 AM with a timer of 2 hours, and be set to high at 5 PM with another timer of 2 hours.

As for the mobility information with time range, the mobility information will be effective in a time range. For example, the mobility information of the sharing bicycle may be set to middle with a time range from 9 AM to 5 PM.

In addition, the mobility pattern, the timer for the mobility information and the time range for the mobility information may be indicated as being recycled or being not recycled.

As for the mobility information with enable or disable indication, the mobility information may be enabled or disabled by this indication. For example, if the WUS resources are limited, the CN node may disable the mobility information. That is, the CN node may configure the UE with a mobility information disable indication.

As shown in FIG. 5, the step 1 may include steps 1-1 to 1-5.

In step 1-1, the "parameters on service information" are sent from the UE to the CN node. The UE may determine its "parameters on service information" based on its capability (UE capability). The step 1-1 is an optional step because the "parameters on service information" adopted by each UE is finally determined by the CN node. However, the UE may notify the CN node of its own "parameters on service information" for consideration. When the CN node sends the determined "parameters on service information" to the UE in step 1-2, the UE will adopt the received determined "parameters on service information" as its own "parameters on service information" no matter whether the received determined "parameters on service information" are the same as the "parameters on service information" sent in the step 1-1. As a whole, the UE and the CN node have a common understanding on the "parameters on service information".

The exchange of the "parameters on service information" between the UE and the CN node in steps 1-1 and 1-2 may be performed in TAU procedure or in Attach procedure. Alternatively, they may be sent together with eDRX parameters information. If the UE is configured with eDRX. As another alternatively, the exchange of the "parameters on service information" between the UE and the CN node in steps 1-1 and 1-2 may be performed in the procedure associated to UE subscription information or Subscription Based UE Differentiation Information.

As the exchange of the "parameters on service information" between the UE and the CN node is performed in NAS layer, the eNB does not know the "parameters on service information". In step 1-3, the CN node sends at least a part of the "parameters on service information" to the eNB.

The CN node may send only a part of the "parameters on service information" to the eNB. For example, when the CN node determines that the "parameters on service information" for a particular UE include paging probability information associated with time information (which implicitly indicates that the paging probability is predictable (regular)), the CN node may choose to only send an indication that the paging probability for the particular UE is predictable (regular) to the eNB instead of the whole paging probability information associated with time information for the particular UE. Similarly, when the CN node determines that the "parameters on service information" for a particular UE include mobility information associated with time information (which implicitly indicates that the mobility information is mobile or stationary), the CN node may choose to only send an indication that the mobility information for the particular UE is mobile or stationary to the eNB instead of the whole mobility information associated with time information for the particular UE. Instead of sending at least a part of the "parameters on service information" to the eNB, the CN node may alternatively choose to send to the eNB an indication on what grouping methods are supported by the particular UE. The grouping methods may include but not limited to: one-level groping method (e.g. UE_ID based grouping method and/or paging probability based grouping method), two-level grouping method (e.g. first by one grouping method and then by another grouping method), three-level grouping method, or any specific grouping method. Here, the one-level grouping method, the two-level grouping method, the three-level grouping method or a specific UE grouping method means the UE grouping method that UE will apply. For example, the one-level grouping method means that UE will only choose one grouping method from UE_ID based method, paging probability-based method, mobility-based grouping method, or any other grouping method. The two-level method or three-level method means that UE will be grouped by the combination of these grouping methods and choose one grouping method on each level. In each level, UE will apply the grouping method as in the one-level grouping method. In addition, CN node could send parameters on service information to eNB. The service information could be at least one of paging probability information and mobility information. CN node could send an indication that the mobility information for a particular UE is mobile or stationary to the eNB. Then eNB could send the WUS associated to UE based on the latest UE mobility information for this eNB. This means the eNB can switch the UE from UE group with stationary attribution to UE group with mobile attribution based on the parameters on service information updated by CN node. The CN node may send UE-specific mobility information to eNB. In step 1-4, the eNB may send an acknowledge information to the CN node. The acknowledge information may include parameters on service information or a suggested part of the "parameters on service information" to help the CN node update the "parameters on service information". The step 1-4 is optional.

In addition, an optional step 1-5 may be included. In step 1-5, the "parameters on service information" may be sent from the UE to the eNB.

A detailed explanation of exchanging mobility information is given. The mobility information of a UE may be computed by UE. The UE could send its mobility information to CN node (step 1-1). The CN node may update the UE mobility information to eNB (step 1-3) so that the eNB knows the UE mobility information. If the eNB does not obtain UE mobility information for a particular UE, it could set the UE mobility information for the particular UE to be a default value. The default value may be mobile or stationary.

In step 2, grouping rule information is determined and transmitted to the UE. The grouping rule information maps the UEs into UE groups supported by WUS resource based on UE grouping method. The grouping rule information could be contained in WUS resource configuration information from eNB. The grouping rule information could classify the UE groups supported by WUS resource based on the UE grouping method, and map the UE with a specific grouping method into the UE group(s) associated to the UE's specific grouping method. Each UE group is grouped based on UE grouping methods. For example, the UE grouping methods include at least UE_ID based method and paging probability based method. In addition, the mobility information (e.g. whether the UE is mobile or stationary) may also be considered in UE grouping methods. Suppose that N UE groups are supported by WUS resource, UE groups 1 to n may be based on paging probability based method while UE groups n+1 to N may be based on UE_ID based method. If the mobility information is applied, UE groups 1 to N may be based on the same mobility information (mobile or stationary). In the condition that multiple WUS channels are supported, the UE groups 1 to n and the UE groups n+1 to N may belong to different WUS channels. Here, the WUS resource could be GWUS resource. The WUS resource (or GWUS resource) could be used to indicate one or more UE groups it could support. The WUS resource configuration information configures the WUS resource in time domain and/or frequency domain for UE grouping.

Examples of mapping UEs into different UE groups are described. For example, UEs are mapped into different group sets before they are further mapped into different groups.

UEs may be grouped into UE group set(s) according to at least a part of the parameters on service information. The parameters on service information include at least one of the paging probability information (regular or random) and the UE mobility information (stationary or mobile). According to different paging probability information (regular or random) and different UE mobility information (mobile or stationary), the UEs may be grouped in four different UE group sets: (1) UEs with mobile mobility information and regular paging probability; (2) UEs with mobile mobility information and random paging probability; (3) UEs with stationary mobility information and regular paging probability; and (4) UEs with stationary mobility information and random paging probability. Generally, the UEs with regular paging probability will be grouped according to paging probability based method, while the UEs with random paging probability will be grouped according to UE_ID based method. That is, UEs in the above UE group sets (1) and (3) will be grouped according to paging probability based method, and UEs in the above UE group sets (2) and (4) will be grouped according to UE_ID based method. For a dedicated PO with paging gap, there could be one WUS channel or a plurality of WUS channels, in which one WUS channel may support a plurality of (e.g. 4) UE groups.

Figure 6:
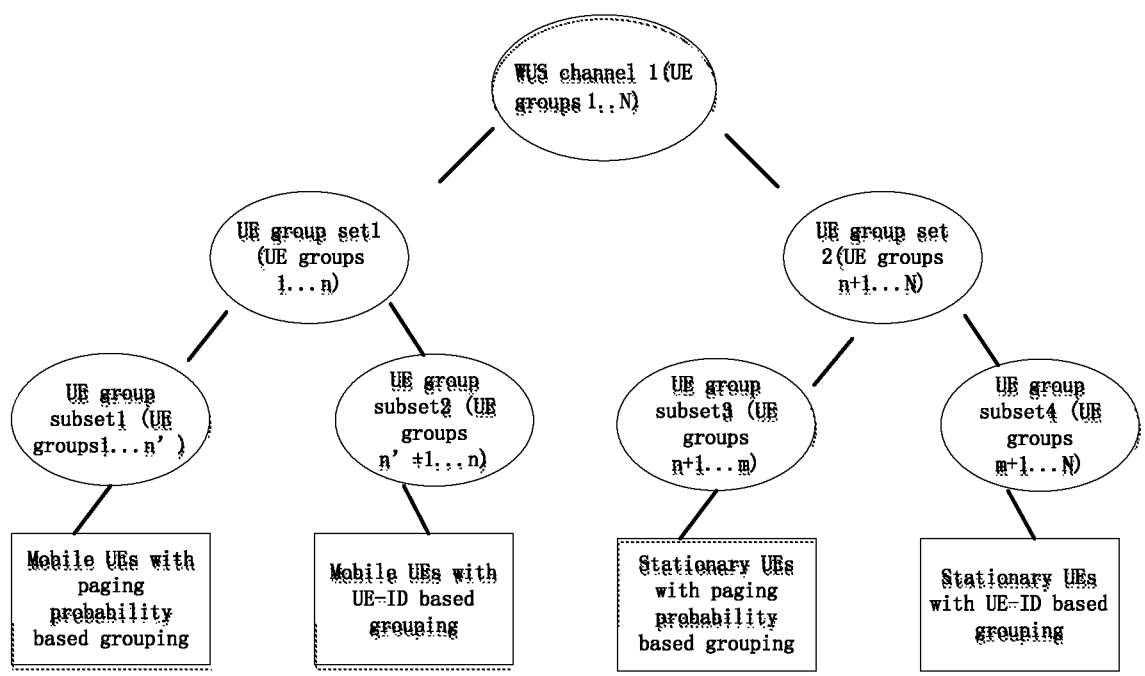
FIG. 6 is a diagram illustrating an example of UE group sets in case of one WUS channel.

In the condition that there is only one WUS channel for a dedicated PO, a UE group set 1 (including UE groups 1-n) may be configured for the UE with mobile mobility information, and a UE group set 2 (including UE groups n+1-N) may be configured for the UE with stationary mobility information. In the UE group set 1, a UE group subset 1 (including UE groups 1-n') may be configured for the UEs with regular paging probability, and a UE group subset 2 (including UE groups n'+1-n) may be configured for the UEs with random paging probability. In the UE group set 2, a UE group subset 3 (including UE groups n+1-m) may be configured for the UEs with regular paging probability, and a UE group subset 4 (including UE groups m+1-N) may be configured for the UE with random paging probability. FIG. 6 shows the UE group sets in case of one WUS channel. N is the number of WUS resources contained in the WUS channel.

Figure 7:
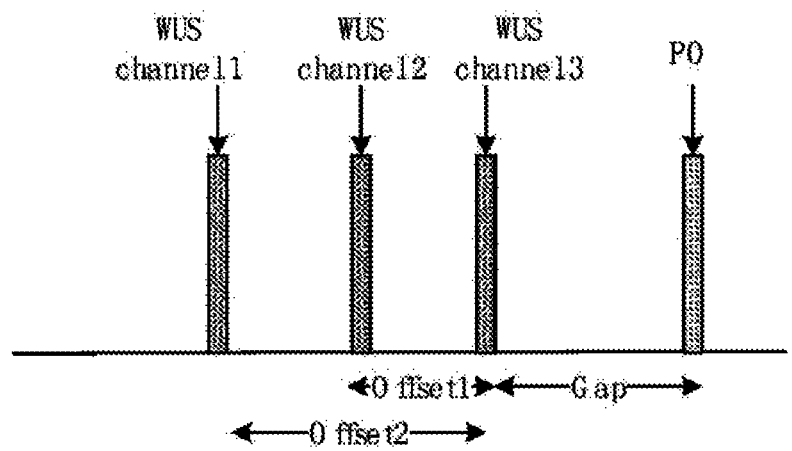
FIG. 7 is a diagram illustrating three WUS channels for one PO.

Instead of one WUS channel for one PO, there could be a plurality of WUS channels for one PO. The plurality of WUS channels could be time or frequency multiplexed with each other. FIG. 7 shows three WUS channels for one PO. There is a gap between the WUS channel 3 and the PO. There is an offset 1 between the WUS channel 2 and the WUS channel 3, and there is an offset 2 between the WUS channel 1 and the WUS channel 3.

Figure 8:
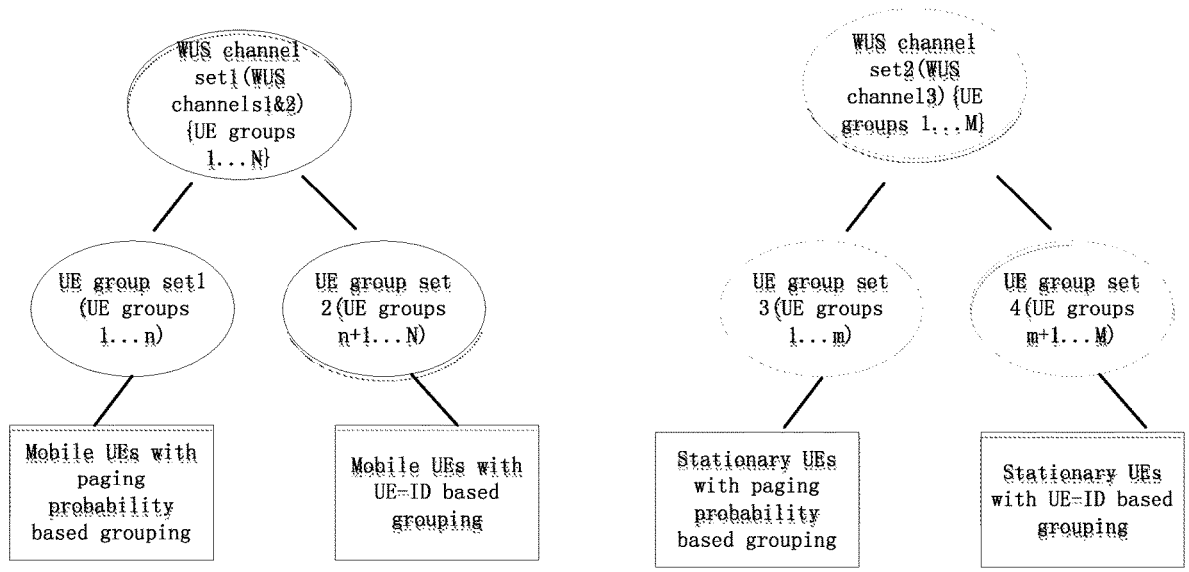
FIG. 8 is a diagram illustrating an example of UE group sets in case of a plurality of (e.g. three) WUS channels.

In the condition that there is a plurality of WUS channels for a dedicated PO, the plurality of WUS channels may be divided into a WUS channel set 1 and a WUS channel set 2, each of which includes one or more WUS channels. FIG. 8 shows the UE group sets in case of three WUS channels. The WUS channel set 1 (including WUS channel 1 and WUS channel 2, i.e. UE groups 1-N) may be configured for the UE with mobile mobility information. N is the number of WUS resources contained in both the WUS channels 1 and 2. The WUS channel set 2 (including WUS channel 3, i.e. UE groups 1-M) may be configured for the UE with stationary mobility information. M is the number of WUS resources contained in the WUS channel 3. In the WUS channel set 1, a UE group set 1 (including UE groups 1-n) may be configured for the UEs with regular paging probability, and a UE group set 2 (including UE groups n+1-N) may be configured for the UEs with random paging probability. In the WUS channel set 2, a UE group set 3 (including UE groups 1-m) may be configured for the UEs with regular paging probability, and a UE group set 4 (including UE groups m+1-M) may be configured for the UEs with random paging probability.

In the above example, UEs are first divided according to whether they are mobile or stationary and then divided according to whether they have regular or random paging probabilities. Alternatively, UEs may be first divided according to whether they have regular or random paging probabilities and then divided according to whether they are mobile or stationary.

As a whole, according to the paging probability information (regular or random) and the UE mobility information (mobile or stationary), UEs are divided to four different group sets. For UEs having regular paging probabilities, they are grouped according to paging probability based method. In addition, for UEs grouped according to paging probability based method, if they have different UE mobility information (mobile or stationary), they belong to different group sets (or different group subsets). For UEs having random paging probabilities, they are grouped according to UE_ID based method. In addition, for UEs grouped according to UE_ID based method, if they have different UE mobility information (mobile or stationary), they belong to different group sets (or different group subsets).

As described above, there could be a plurality of WUS channels. Therefore, different group sets may belong to different WUS channels.

In the above examples of mapping UEs into different group sets, the UEs are mapped into four group sets. Alternatively, the UEs may be mapped into groups fewer than four. For example, if there are not enough WUS resources for supporting four group sets, fewer group sets (as few as 1 group set) may be configured. In the condition of fewer group sets, the paging probability information (regular or random) or the UE mobility information (mobile or stationary) is not considered. For example, the UEs may be mapped to two group sets of with regular paging probability and with random paging probability, in which the UE mobility information is not considered. For another example, the UEs may be mapped to two group sets of being mobile and being stationary, in which the paging probability information is not considered. For yet another example, the UEs may be mapped to three group sets of (1) being stationary and with regular paging probability; (2) being mobile and with regular paging probability; and (3) with random paging probability, in which if the UE has random paging probability, the UE mobility information is not considered. After being divided into group sets, the UEs in respective group set may be further divided into different groups within the respective group set. Different methods may be used for dividing into groups.

Figure 9:
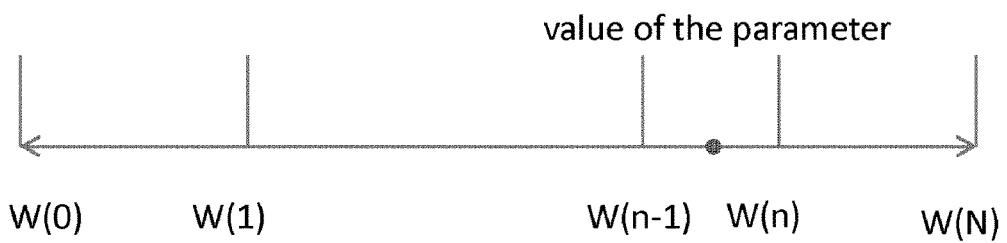
FIG. 9 is a diagram illustrating a threshold-based method for computing group ID.

In the above examples of mapping UEs into different group sets, the UEs are mapped into two group sets, in which one group set is for UEs with highly wrong paging alarm while another group set is for UEs with lowly wrong paging alarm. For example, the UEs with high paging probability and UEs with mobile attribution will belong to a group set A, the UEs with low paging probability and UEs with stationary attribution will belong to a group set B. UEs in group set A or group set B could be grouped based on UE_ID based groping method. The UEs without paging probability parameter or mobility parameter will be grouped in to group set C or in group set A. UEs in group set C could be grouped based on UE_ID based grouping method. The group number of group set A, group set B, or group set C could be zero, one or more. In a first method, the UEs are further divided into different groups according to a threshold-based method as shown in FIG. 9. As shown in FIG. 9, when the value of the parameter (such as paging probability value) is in a zone between W(n−1) and W(n), the UE is put into group n. In particular, W(0)-W(n) are pre-determined thresholds. All of the values of the parameter falling within the zone from W(0)-W(1) belong to the first group, i.e. group 1. Similarly, the group ID for all of the values of the parameter falling within the zone from W(n−1)-W(n) is n. Incidentally, if the value of the parameter equals to W(n), it belongs to group n, except that if the value of the parameter equals to W(0), it belongs to group 1.

For example, suppose that the number of the groups is 3, and W(0)=0, W(1)=0.4, W(2)=0.7, W(3)=1, zone1 is the zone from W(0) to W(1), zone2 is the zone from W(1) to W(2), zone3 is the zone from W(2) to W(3). If the value of the parameter (x) for a UE is equal to 0.65 then x falls within the zone2. Accordingly, the group ID for the UE is 2.

Figure 10:
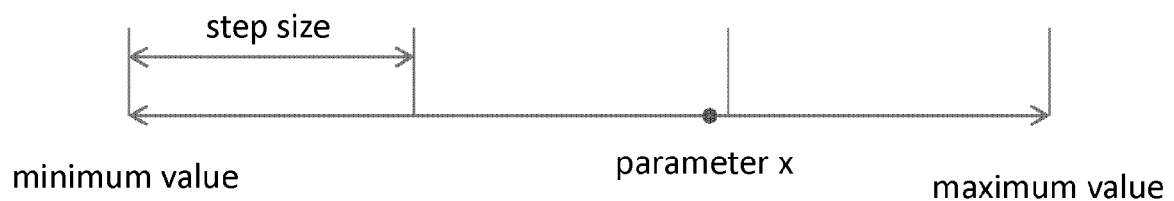
FIG. 10 is a diagram illustrating a second method for computing group ID.

In a second method, the group ID is computed by the following equation (referred to as equation method): group ID=ceil ((parameter x−minimum value)/step size), wherein step size=(maximum value−minimum value)/the number of groups. The maximum value and the minimum value represent the upper limit and the lower limit of the thresholds, and are pre-determined. FIG. 10 shows the second method.

For example, suppose that the number of the groups is 3, and the minimum value (i.e. the lower limit of the thresholds) is 0, the maximum value (i.e. the upper limit of the thresholds) is 1, then the step size=(1-0)/3=0.33 (⅓). If UE parameter x=0.65, then the group ID=ceil ((0.65-0)/0.33)=2. Accordingly, the group ID for the UE is 2. In other words, thresholds 0, 0.33 (⅓), 0.66 (⅔) and 1 are calculated so that the values of the parameter falling within 0 and 0.33 (⅓) belong to group1, falling within 0.33 (⅓) and 0.66 (⅔) belong to group2, and falling within 0.66 (⅔) and 1 belong to group3.

Incidentally, given a specific number of the groups, since the step size can be calculated from the maximum value and the minimum value, it is also possible that the maximum value and the step size are predetermined (because the minimum value can be calculated from the maximum value and the step size) or the minimum value and the step size are predetermined (because the maximum value can be calculated from the minimum value and the step size).

As shown in FIG. 5, step 2 may include steps 2-1 to 2-5.

In step 2-1, the CN node sends CN node configuration information to UE through eNB. The CN node configuration information could include UE grouping method configured by the CN node. For example, the CN node configuration information could include information on whether the CN node supports working on at least one of one-level grouping method (e.g. the UE_ID based method and/or the paging probability based method), two-level grouping method (e.g. by UE_ID based method before by paging probability based method, and/or by paging probability based method before by UE_ID based method), three-level grouping method, mapping UEs into group sets in consideration of paging probability information (regular or random) and/or UE mobility information (mobile or stationary) or not, etc. This CN node configuration could be sent in TAU procedure or in Attach procedure. Alternatively, this CN node configuration could be sent in paging or SIB information through eNB.

In step 2-2, the eNB sends eNB configuration information to the UE. The eNB configuration information could include eNB capability supported by the eNB. The eNB capability could include information similar to that contained in the CN node configuration information. The eNB configuration information may be sent by Radio Resource Control (RRC) signaling, by System Information Block (SIB) information, or by paging.

In step 2-3, the UE reports (UE function) to the eNB and/or the CN node. The UE function may be determined based on at least one of its capability (UE capability), the CN node configuration information and the eNB configuration information. The UE function may include information similar to that contained in the CN node capability.

The steps 2-1 to 2-3 may not be necessary to be performed. The CN node configuration information, the eNB configuration information and the UE function may be predetermined. The UE function may also be known by the eNB and/or the CN node.

In step 2-4, the grouping rule information is generated. The grouping rule information may be generated by the eNB and/or by the CN node. The grouping rule information may be generated based on at least one of the UE function, the CN node configuration information and the eNB configuration information.

In step 2-5, the grouping rule information is transmitted to the UE. There are various ways to send the grouping rule information to the UE.

One possible way to send the grouping rule information to the UE is by using UE attach procedure or TAU (Tracking Area Update) procedure. The attach or TAU procedure is performed between the UE and CN node through the eNB. Therefore, when the grouping rule information is determined by the CN node, it is preferable to send the grouping rule information by UE attach or TAU procedure.

Another possible way to send the grouping rule information to the UE is by RRC signaling or SIB from eNB. When the grouping rule information is determined by the eNB, it is preferable to send the grouping rule information by RRC signaling or SIB from the eNB. For example, the grouping rule information may be broadcasted by being included in group WUS configuration information. Incidentally, when the grouping rule information is determined by the eNB, the eNB may notify the CN node about the grouping rule information.

As described above, the UE may receive the grouping rule information from the eNB and/or the CN node. If the UE receives different grouping rule information from the eNB and the CN node, the UE will follow the grouping rule information received from the eNB based on the group WUS configuration information from the eNB. For example, if the number of WUS resources (i.e. the number of UE groups supported by eNB) is big, the eNB may configure different kinds of group sets or groups to group UEs. On the other hand, for example, if the number of WUS resources is small, i.e. not enough to support many groups, in the condition that the number of UEs with random paging probability is much more than the number of UEs with regular paging probability, the eNB may configure all of the UEs (whether they have random paging probability or regular paging probability) to use UE_ID based method for grouping (which is cell-specific, i.e. specific to the eNB).

In step 3, the UE computes its group ID based on the parameters on service information and the grouping rule information. In particular, the UE computes the group set ID before computing the group ID.

The group set ID may be determined according to the received grouping rule information. The received grouping rule information includes a certain method for mapping the UEs into group sets, e.g. one-level grouping method (e.g. the UE_ID based method and/or the paging probability based method) or two-level grouping method (e.g. by UE_ID based method before by paging probability based method, and/or by paging probability based method before by UE_ID based method) or three-level grouping method.

The group ID may be further computed. If the UE is grouped according to UE_ID based method, the UE may use a MOD calculation to compute the group ID. If the UE is grouped according to paging probability based method, the UE may use the threshold-based method or the equation method to compute the group ID.

The parameter (i.e. the paging probability) is different in different periods (see Table 1). Therefore, in different periods, the group set ID and/or the group ID to which the UE belongs may be different.

In the above examples, the grouping rule information is determined by the eNB and/or the CN node. Alternatively, the grouping rule information may be determined in a time-specific manner. That is, in different time periods, the grouping rule information may be determined differently. That is, the method for mapping UEs into group sets and/or the method for mapping UEs into groups may be different in different time periods. For example, there could be one or more grouping rules that may be contained in the grouping rule information. The grouping rule information may be sent with time information, such as a timer or a time range or a disable/enable indication. The time information may notify the UE which grouping rule contained in the grouping rule information is effective at which time period.

As a whole, the UE would compute the group ID for a certain time period according to the grouping rule information that could be time-specific and the parameters on service information that could also be time-specific.

In step 4, the UE monitors WUS related to the group ID. Here, the WUS with single sequence CDM could be multiplexed by UEs based on different group rules. A WUS with single sequence CDM means that one type of group set is associated to a WUS. Accordingly, only one WUS needs to be transmitted no matter what kind of group set is shown. The WUS with single sequence CDM is designed based on Code information. The Code information could be designed by at least one of frequency domain orthogonal cover codes, scrambling initialization, phase shifted scrambling codes, and Zadoff-Chu phase shift. For example, the WUS with single sequence CDM for service-based grouping could be TDM (Time-Division Multiplexing) with the WUS with single sequence CDM for UE_ID based grouping. The WUS with single sequence CDM for service-based grouping could be FDM (Frequency-Division Multiplexing) with the WUS with single sequence CDM for UE_ID based grouping. Thus, the WUS with single sequence CDM could be multiplexed by UEs based on different group rules. The multiplexing method could be one of TDM, FDM or CDM, or the combination of TDM, FDM and CDM. The offset in time domain between a WUS with single sequence CDM for one UE grouping rule and a WUS with single sequence CDM for another UE grouping rule will be transmitted to UE. UE will receive the offset in time domain between a WUS with single sequence CDM for one UE grouping rule and a WUS with single sequence CDM for another UE grouping rule from eNB or MME. Based on this offset, UE will monitor the WUS associated to its grouping rule.

In step 5, once the WUS is received, the UE receives paging in a paging occasion.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive parameters on service information and grouping rule information; and
compute a group identifier based on the received parameters on service information and the grouping rule information, wherein the service information is at least one of paging probability information and mobility information, and wherein the group identifier is computed using the at least one paging probability information and a number of groups, and the group identifier corresponds to a group wake-up-signal (WUS).

2. The UE of claim 1, wherein the mobility information implicitly or explicitly indicates whether the UE is stationary or mobile.

3. The UE of claim 2, wherein the mobility information implicitly or explicitly indicates whether the UE is stationary or mobile relative to a base station or a specific cell of the base station.

4. A base station, comprising:
at least one memory; and
at least one processor coupled with the at least one memory and configured to cause the base station to:
determine grouping rule information; and
transmit the grouping rule information to configure a user equipment (UE) to compute a group identifier based on parameters on service information and the grouping rule information, wherein the service information is at least one of paging probability information and mobility information, and wherein the group identifier is computed using the at least one paging probability information and a number of groups, and the group identifier corresponds to a group wake-up-signal (WUS).

5. The base station of claim 4, wherein the mobility information implicitly or explicitly indicates whether the UE is stationary or mobile.

6. The base station of claim 5, wherein the mobility information implicitly or explicitly indicates whether the UE is stationary or mobile relative to the base station or a specific cell of the base station.

7. The base station of claim 4, wherein the at least one processor is configured to cause the base station to receive, from a core network node, the parameters on service information.

8. The base station of claim 7, wherein UE mobility information is received.

9. A core network node, comprising:
at least one memory; and
at least one processor coupled with the at least one memory and configured to cause the core network node to:
determine parameters on service information; and
transmit:
the parameters on service information to trigger a user equipment (UE) to compute a group identifier based on the parameters on service information and grouping rule information, wherein the service information is at least one of paging probability information and mobility information, and wherein the group identifier is computed using the at least one paging probability information and a number of groups, and the group identifier corresponds to a group wake-up-signal (WUS); and
parameters on service information to a base station.

10. The core network node of claim 9, wherein the grouping rule information is associated with time.

11. The core network node of claim 9, wherein the paging probability information indicates whether the paging probability is predictable or unpredictable.

12. The core network node of claim 11, wherein the paging probability information is paging probability information associated to time information.

13. The core network node of claim 12, wherein the paging probability information associated to time information is paging pattern based on time, or paging probability with timer, or paging probability with time range, or paging probability with enable or disable indication, or a combination thereof.

14. The core network node of claim 9, wherein the mobility information implicitly or explicitly indicates whether the UE is stationary or mobile.

15. The core network node of claim 14, wherein the mobility information implicitly or explicitly indicates whether the UE is stationary or mobile relative to the base station or a specific cell of the base station.

16. The core network node of claim 14, wherein the mobility information is mobility information associated with time information.

17. A method performed by a user equipment (UE), the method comprising:
- receiving parameters on service information and grouping rule information; and
- computing a group identifier based on the received parameters of service information and the grouping rule information, wherein the service information is at least one of paging probability information and mobility information, and wherein the group identifier is computed using the at least one paging probability information and a number of groups, and the group identifier corresponds to a group wake-up-signal (WUS).

* * * * *